US008904531B1

(12) United States Patent
Saklikar et al.

(10) Patent No.: US 8,904,531 B1
(45) Date of Patent: Dec. 2, 2014

(54) DETECTING ADVANCED PERSISTENT THREATS

(75) Inventors: Samir D. Saklikar, Karnataka (IN);
Aditya Kuppa, Karnataka, IN (US);
Dennis Ray Moreau, Providence, RI (US); Riaz Zolfonoon, Concord, MA (US)

(73) Assignee: EMC Corporation, Hopkinton, MA (US)

( * ) Notice: Subject to any disclaimer, the term of this patent is extended or adjusted under 35 U.S.C. 154(b) by 658 days.

(21) Appl. No.: 13/172,979

(22) Filed: Jun. 30, 2011

(51) Int. Cl.
*G06F 12/14* (2006.01)

(52) U.S. Cl.
USPC .............................. 726/23; 726/25; 707/695

(58) Field of Classification Search
CPC . H04L 63/1416; H04L 63/1425; G06F 21/50; G06F 21/55; G06F 21/552; G06F 21/554; G06F 21/556; G06F 21/62; G06F 21/6272; G06F 21/78
USPC ...................................... 726/23, 25; 707/695
See application file for complete search history.

(56) References Cited

U.S. PATENT DOCUMENTS

| 8,127,360 | B1 * | 2/2012 | Wilhelm et al. ................ 726/25 |
| 2005/0240781 | A1 * | 10/2005 | Gassoway ..................... 713/188 |
| 2006/0036670 | A1 * | 2/2006 | Musman ....................... 709/202 |
| 2007/0133043 | A1 * | 6/2007 | Maekawa et al. ............. 358/1.15 |
| 2009/0299994 | A1 * | 12/2009 | Krishnamurthy et al. ........ 707/5 |
| 2010/0011031 | A1 * | 1/2010 | Huang et al. .................. 707/202 |
| 2012/0005147 | A1 * | 1/2012 | Nakakoji et al. ................ 706/47 |

OTHER PUBLICATIONS

Dotan, et al., "Generation of Alerts in an Event Management System Based Upon Risk," U.S. Appl. No. 13/172,999, filed Jun. 30, 2011.
Vaystikh, et al., "Malware Detection Using Risk Analysis Based on File System and Network Activity," U.S. Appl. No. 12/981,072, filed Dec. 29, 2010.

* cited by examiner

*Primary Examiner* — Joseph P. Hirl
*Assistant Examiner* — Thomas Gyorfi
(74) *Attorney, Agent, or Firm* — BainwoodHuang (57) ABSTRACT

Techniques are provided for detecting the source of an APT-based leaked document by iteratively or recursively evaluating a set of network security logs (e.g., SIEM logs and FPC logs) for events consistent with APT behavior according to a set of heuristics to generate a reduced set of security events for consideration by the CIRT. A method of detecting an APT attack on an enterprise system is provided. The method includes (a) receiving, in a computerized device, an indication that a document has been leaked outside the enterprise system, (b) evaluating a log of security events of the enterprise system using a set of heuristics to produce a reduced set of events potentially relevant to the APT attack, and (c) outputting the reduced set of events over a user interface for consideration by a security analysis team. A system and computer program product for performing this method are also provided.

14 Claims, 4 Drawing Sheets

DETECTING ADVANCED PERSISTENT THREATS

BACKGROUND

Enterprise networks are susceptible to many types of malicious intrusions, such as viruses, malware, advanced threats, etc. Many enterprise networks utilize security information and event management (SIEM) applications to aggregate security events from diverse parts of the network and provide real-time alerts of immediate security threats.

Some enterprise networks also utilize full packet capture (FPC) based solutions to keep a record of all data packets exchanged across the network. These solutions typically capture an incredibly large amount of data that can only be maintained for a short period of time due to storage constraints.

SUMMARY

The above described approaches suffer from deficiencies when the enterprise network is attacked by an advance persistent threat (APT). One of the distinguishing aspects of APTs is maintaining a low-and-slow nature of existence and propagation. They are specifically designed to possibly delay reaching their eventual goal, if such a step might risk an immediate detection. Hence, even if events or alerts are reported for APT-like infections, they would typically be well-distributed in time and not appear at a high-enough priority to be considered by a Critical Incident Response Team (CIRT). This is often exacerbated because typical SIEM solutions are more geared to identifying what is causing the "biggest" problem within the enterprise network at a given time—the term big usually defined by the number of infections or high volume of suspicious activity. APTs aim to steer clear of such volume-based detection mechanisms by staggering their behavior within time or space (e.g., engaging in partial interactions with command & control [CnC] using multiple compromised hosts within the same enterprise, but exchanging information between the hosts to derive the overall CnC payload). In addition to their low-and-slow nature, APTs are typically custom-built for the target environment leveraging multiple zero-day attacks or using social engineering targeted attacks to make their entry into the specific user's endpoint system.

Given such an advanced nature of attacks, it is very difficult to detect or defend against ongoing APT attacks within an enterprise. Instead, the fact that an enterprise was an under an APT attack is typically identified not via internal SIEM monitoring but through external sources such as the presence of confidential material on the Internet, indicating a potential compromise in the past. Additionally, even after such a leak (pointing to their potential presence) is identified, it is still not easy to detect the point of APT infection and whether the infection is still active within the enterprise. This post-infection (or delayed) infection detection rate is very low for APTs as compared to other typical malware because, over-time, anti-virus and anti-malware solutions will start adding the signatures for the malware, as it is noticed at increasing number of different places. However, since APTs are custom-built, it is unlikely that they will be present (at least not in the same form) at another enterprise to facilitate such collaborated defense techniques. Hence, APTs present a significant problem—by being difficult to identify even when one knows that they may exist in the system.

In contrast to the above-described approaches, embodiments of the present disclosure are directed to techniques for detecting the source of an APT-based leaked document by iteratively or recursively evaluating a set of network security logs (e.g., SIEM logs and FPC logs) for events consistent with APT behavior according to a set of heuristics to generate a reduced set of security events for consideration by the CIRT. Evaluation continues until the size of the reduced set of security events exceeds a minimum threshold. In some embodiments, evaluation also continues until the size of the reduced set of security events is reduced below a maximum threshold.

In particular, in one embodiment, a method of detecting an APT attack on an enterprise system is provided. The method includes (a) receiving, in a computerized device, an indication that a document has been leaked outside the enterprise system, (b) evaluating a log of security events of the enterprise system using a set of heuristics to produce a reduced set of events potentially relevant to the APT attack, and (c) outputting the reduced set of events over a user interface for consideration by a security analysis team. A system and computer program product for performing this method are also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present disclosure are directed to techniques for detecting the source of an APT-based leaked document by iteratively or recursively evaluating a set of network security logs (e.g., SIEM logs and FPC logs) for events consistent with APT behavior according to a set of heuristics to generate a reduced set of security events for consideration by the CIRT. Evaluation continues until the size of the reduced set of security events exceeds a minimum threshold. In some embodiments, evaluation also continues until the size of the reduced set of security events is reduced below a maximum threshold.

Description of System, Hardware, and Software Arrangement

Figure 1:
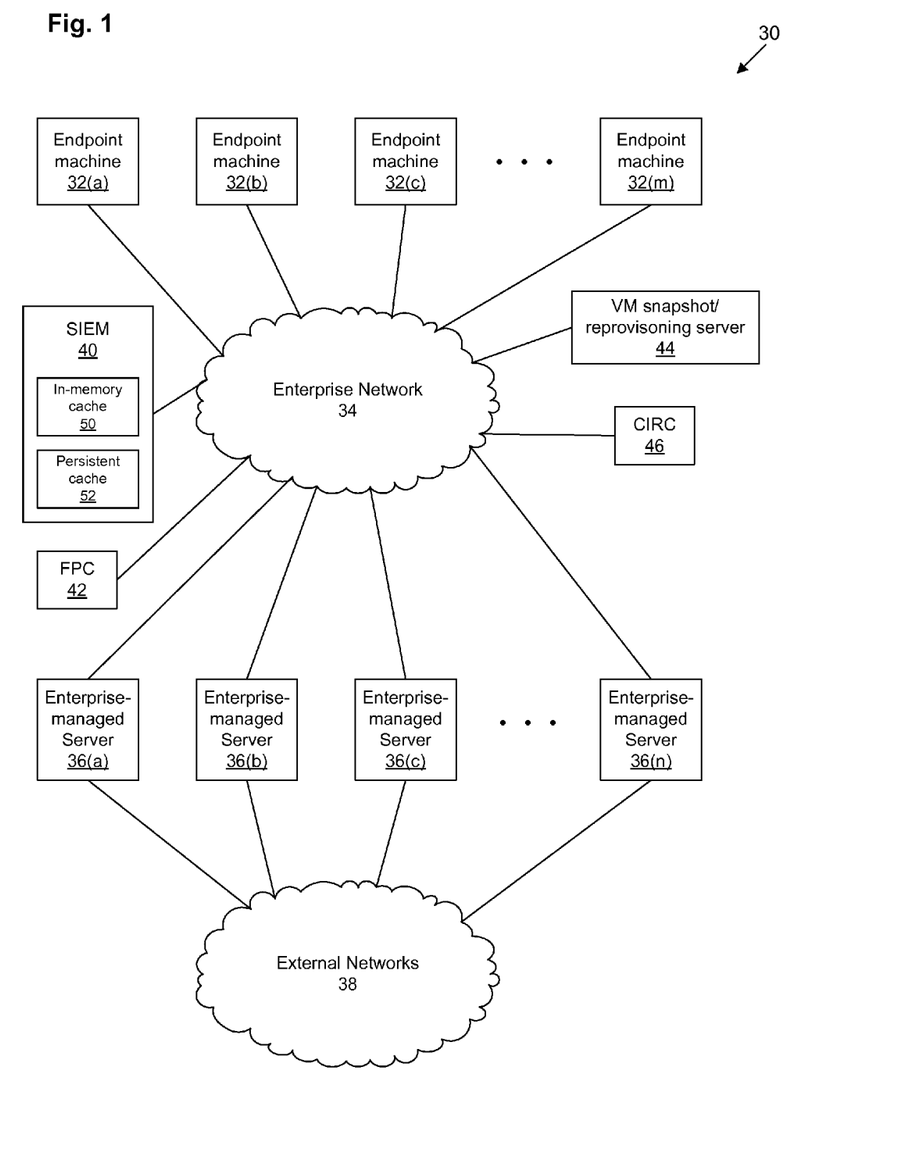
FIG. 1 illustrates an example system for use in practicing various embodiments.

FIG. 1 depicts an example system 30 for use in practicing various embodiments. System 30 may include an enterprise network 34, connected to one or more external networks 38 (e.g., the Internet) by one or more Enterprise-managed servers 36. Enterprise network 34 also contains a set of endpoint machines 32, a SIEM application server 40, and a Critical Incident Response Center (CIRC) server 46. In some embodiments, enterprise network 34 also contains an FPC application server 42 and a virtual machine (VM) snapshot and reprovisioning server 44. Each of SIEM application server 40, CIRC server 46, FPC application server 42, and VM snapshot and reprovisioning server 44 may, depending on the embodiment, either run on a dedicated server or may be a process running on a server hosting other applications. Enterprise network 34 may be any sort of connection medium capable of connecting components 32, 36, 40-46, such as, for example, a packet-switched network, a local area network, a wide area network, a storage area network, the Internet, a circuit-switched network, a fabric of interconnected cables and/or wires, a wireless network, a cellular network, or a point-to-point connection. The endpoint machines 32, the Enterprise-managed servers 36, the CIRC server 46, and the servers running applications 40, 42, 44 may be any sort of computerized devices, such as a computer, a mainframe, a terminal, a smart phone, etc.

In some embodiments, the Enterprise-managed servers 36 and the servers 40-46 are considered members of the set of endpoint machines 32. In some embodiments, the Enterprise-managed servers 36 include web servers, file transfer protocol (FTP) servers, mail servers, and similar types of servers. In some embodiments, the Enterprise-managed servers 36 include virtual web servers, virtual FTP servers, virtual mail servers, and similar types of virtual servers running as VMs on one or more computerized devices. In such embodiments, these virtual servers are periodically provisioned or reprovisioned by VM snapshot and reprovisioning server 44, which also takes VM snapshots of the VM states prior to each reprovisioning In some embodiments, the Enterprise-managed servers 36 are external to enterprise network 34, but are managed by the Enterprise, nevertheless.

In some embodiments, SIEM application server 40 may run the enVision platform produced by RSA, the Security Division of EMC, a corporation based in Hopkinton, Mass.

Recall that APT attacks typically maintain a low-and-slow nature of existence and propagation by staggering their behavior within time or space. CIRC server 46 functions to detect APT attacks on enterprise network 34 according to various embodiments, using data drawn from multiple sources around the enterprise network 34 and identifying patterns indicative of this type of staggered behavior. CIRC server 46 does this by drawing on data from the Critical Incident Response Team (CIRT), SIEM application server 40, FPC application server 42, and VM snapshot and reprovisioning server 44, all of which include data from various parts of the network 34 as well as from a wide range of times. CIRC server 46 is then able to generate and apply heuristics to this data in order to identify particularly suspicious behavior.

Figure 2:
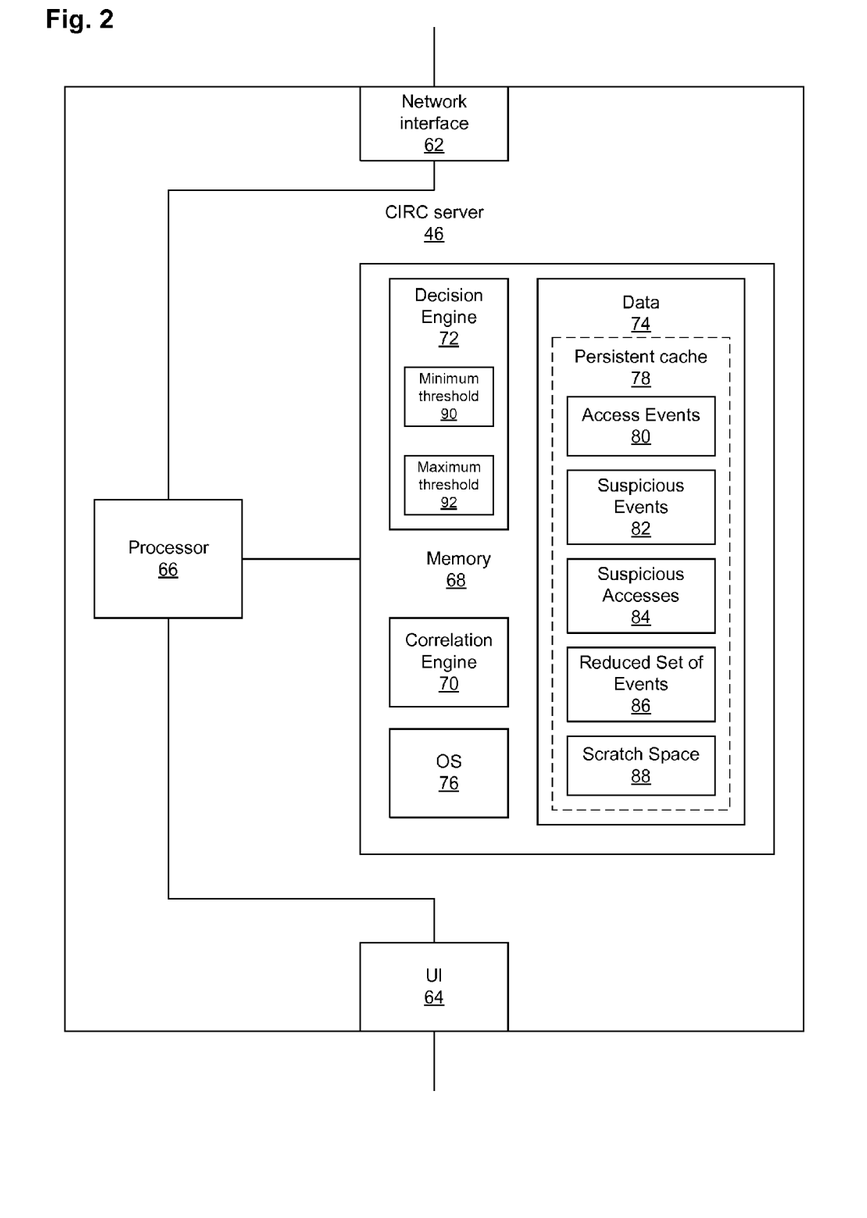
FIG. 2 illustrates an example apparatus according to various embodiments.

FIG. 2 depicts an example CIRC server 46 in further detail. It should be understood that CIRC server 46 may be implemented as a software application running together with other applications on a computerized device, but, as depicted, CIRC server 46 is implemented as a dedicated server. CIRC server 46 includes a network interface 62, a user interface 64, a processor 66, and memory 68. Processor 66 may be a microprocessor, a central processing unit, an integrated circuit, a collection of integrated circuits, a set of processing circuitry, a field programmable gate array, a signal processor, similar elements, or some combination thereof.

In some embodiments, processor 66 is a general purpose processor configured to execute operations stored in software programs contained within memory 68. In connection with these embodiments, it should be understood that, within this document, any time a piece of software contained within memory 68 is described as performing a particular task or operation, that is mere shorthand for performance of the particular task or operation by the processor 66 executing code contained within that piece of software.

In other embodiments, processor 66 includes a set of processing circuitry that may be configured to perform operations directly in its hardware design as a pipeline of connected modules each having specifically-designed operations. In connection with these embodiments, it should be understood that, within this document, any time a piece of software contained within memory 68 is described as performing a particular task or operation, that is mere shorthand for performance of the particular task or operation by an appropriate circuitry module of the processor 66.

Network interface 62 is a hardware device that is configured to connect CIRC server 46 to network 34 so that communications can be carried out across the network 34. It should be understood that network interface 62 may have one or more connections to network 34 and that network interface 62 may connect to other networks in addition to network 34.

User interface 64 is a hardware interface that is configured to connect to various user interface devices (not depicted) that allow for communication between a human user, such as a member of a CIRT, and the CIRC server 46 by receiving user input and/or by providing information to the user. Examples of user interface devices that may connect to user interface 64 may include, for example, a display, a monitor, a television, a cathode ray tube, a liquid crystal display, a plasma display, a light-emitting diode display, a keyboard, a keypad, a mouse, a tracking pad, a tracking stick, a tracking ball, a touch screen, a biometric device, a joystick, a printer, a plotter, a projection screen, similar devices, or some combination thereof (not depicted).

Memory 68 may be any kind of digital memory, such as for example, system memory, cache memory, volatile memory, random access memory, read-only memory, static memory, programmable read-only memory, flash memory, magnetic disk-based storage, optical disk-based storage, a hard disk, a floppy disk, a compact disc, a digital versatile disc, a blu-ray disc, similar devices, or some combination thereof. Typically memory 68 will include high-speed volatile system memory for storage of executing programs and data as well as lower-speed non-volatile long-term storage for permanent storage of programs.

Memory 68 stores a correlation engine 70, a decision engine 72, data 74, and operating system 76 for execution by processor 66. It should be understood that, in some embodiments, correlation engine 70 and decision engine 72 operate on separate servers or in a distributed fashion across a plurality of servers. Correlation engine 70 and decision engine 72 are, in some embodiments, separate components because it is more efficient to separate decision and correlation processing, to allow them to run in parallel. Additional benefits of this structure will be apparent after further description. Details of the correlation engine 70 and decision engine 72 will be provided below, in connection with the description of FIGS. 3-4.

In some embodiments, some or all of data 74 is stored within a persistent cache 78 of memory 68. Data 74 may store a set of access events 80, a set of suspicious events 82, a set of suspicious accesses 84, a reduced set of events 86, and scratch space 88. Decision engine 72 may also store a minimum threshold size value 90 and a maximum threshold size value 92. Further details with respect to elements 80-92 72 will be provided below, in connection with the description of FIGS. 3-4.

Memory 68 may also store additional data and executing programs as well as user files (not depicted).

Description of Methods

As mentioned previously, CIRC server 46 is configured to detect APT attacks on the enterprise network 34 by generating and applying heuristics to identify patterns within data drawn from diverse sources. CIRC server 46 accomplishes this task by performing a method, such as method 100, depicted in FIG. 3.

Figure 3:
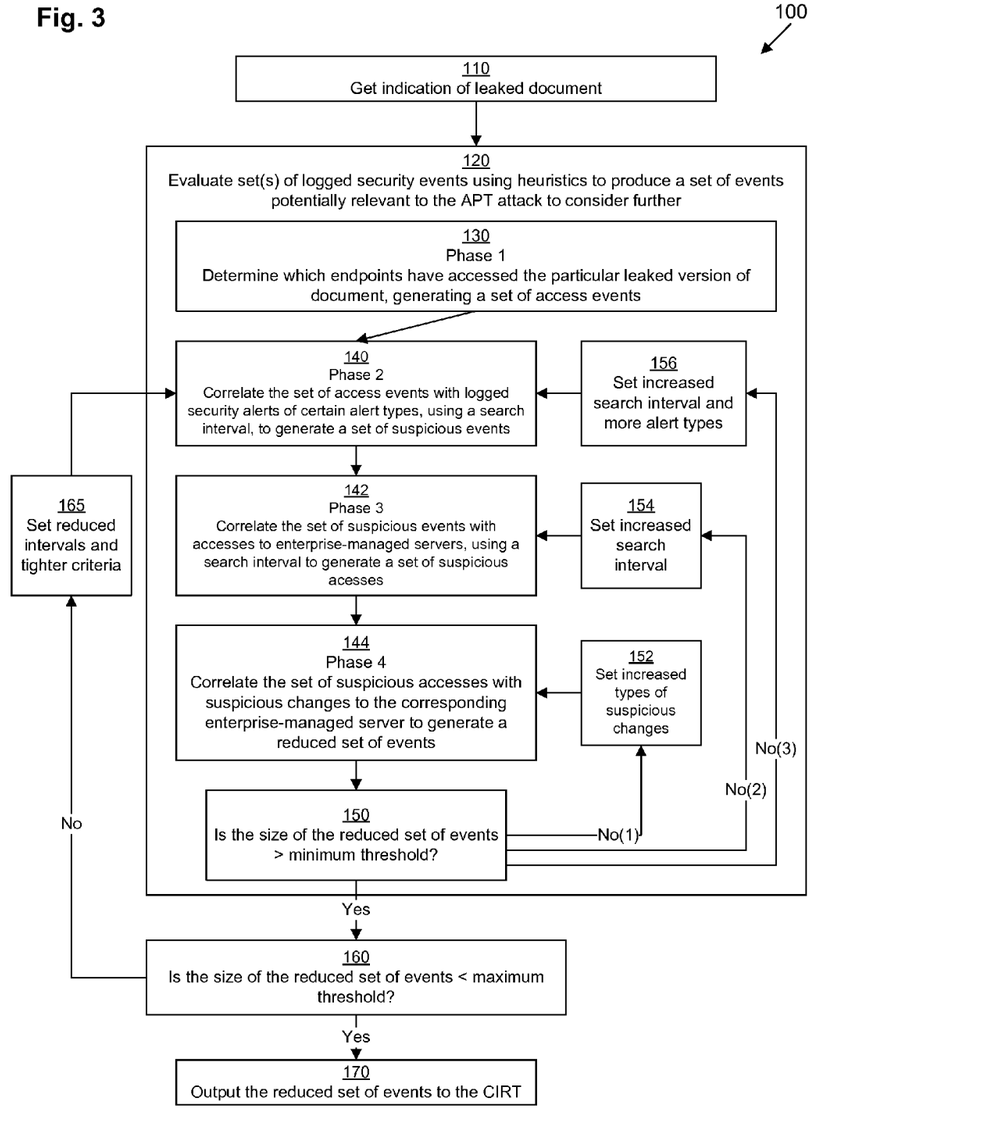
FIG. 3 illustrates an example method according to various embodiments.

As indicated in FIG. 3, broadly, method 100 involves first receiving an indication of a leaked document (step 110), then evaluating one or more sets of logged security events using various heuristics to produce a reduced set of events 86 potentially relevant to the APT attack for further consideration by the CIRT (step 120), optionally testing to make sure that the size of the reduced set of events 86 does not exceed the maximum threshold (step 160, and looping back into step 120 via step 165 if it does exceed), and reporting out the reduced set of events 86 to the CIRT (step 170). In some embodiments, step 120 may be broken down into four phases that: determine the set 80 of endpoints 32 that have accessed the leaked documents (phase 1), correlate the security logs with the document access events set 80 to produce a set of suspicious events 82 (phase 2), correlate the set of suspicious events 82 with accesses to enterprise-managed servers 36 to produce a set of suspicious accesses 84 (phase 3), and correlate the set of suspicious accesses 84 to suspicious changes to enterprise-managed servers 36 to produce the reduced set of events (phase 3). In some embodiments, additional steps are performed to ensure that the size of the reduced set of events is not too small (steps 150-156).

Proceeding now to discuss method 100 in detail, in step 110, CIRC server 46 receives an indication that a particular version of a particular document has been improperly leaked outside the enterprise in a manner consistent with an APT. The particular document is stored on a storage device within enterprise network 34 such that it is accessible to one or more endpoint machine 32, with reference to FIG. 1. The document may be any kind of data which can be expressed in a file or record content which can be stored on disk or in a database, such as, for example, a text document, a word-processing document, a spreadsheet, a presentation, a media file, a source code program, a binary executable, a disk image, memory contents, etc. The document may be stored on, for example, a hard drive of an endpoint machine 32, a hard drive of an Enterprise-managed servers 36, a storage area network accessible by an endpoint machine 32, or network attached storage. In some embodiments, the indication of the leak comes from a member of the CIRT via the UI 64 in response to a report that the particular version of the leaked document has been leaked, e.g., when the document is found on the Internet. In other embodiments, the indication comes automatically across network interface 62 in an automated response to a report of a leak.

In step 120, CIRC server 46 evaluates one or more sets of logged security events using heuristics (which may be generated by the decision engine 72 and applied by the correlation engine 70) to produce a set of events (e.g., reduced set of events 86) potentially relevant to the APT attack to consider further. The one or more sets of logged security events may include, for example, a SIEM log produced by SIEM application server 40, a full-packet capture log produced by FPC application 42, another set of logged security events, or some combination of these logs, depending on availability. Further details with respect to step 120 will be provided below.

Upon producing a reduced set of events 86, operation may proceed to optional step 160. In step 160, CIRC server 46 compares the size of the reduced set of events 86 to the maximum threshold 92. If the size of the reduced set of events 86 exceeds the maximum threshold 92 (known as a negative result), then, in step 165, the CIRC server 46 modifies the heuristics by setting reduced search intervals and other tighter search criteria, repeating step 120 until the size of the reduced set of events 86 no longer exceeds maximum threshold 92. Once the size of the reduced set of events 86 does not exceed maximum threshold 92 (known as an affirmative result), operation proceeds to step 170, in which CIRC server 46 outputs the reduced set of events 86 to a security analysis team, such as the CIRT, over the UI 64. This allows the CIRT to review a manageable set of logged security events for potential relation to the APT in order to attempt to ascertain the source of the APT infection to prevent further leaks and to close security holes to prevent future infections by similar APTs.

Returning to step 120 in further detail, in one embodiment, four phases of execution make up step 120—sub-steps 130, 140, 142, and 144. In some embodiments, steps 150-156 are also included in order to ensure that at least a minimum number of results are returned.

In phase 1, step 130, CIRC server 46 determines which endpoints 32 have accessed the particular leaked version of the document, generating a set of access events 80. Each element of the set of access events 80 stores an indication of which endpoint 32 accessed the document and at what date/time. In some embodiments, each element also stores additional information about the particular document access event.

Figure 4:
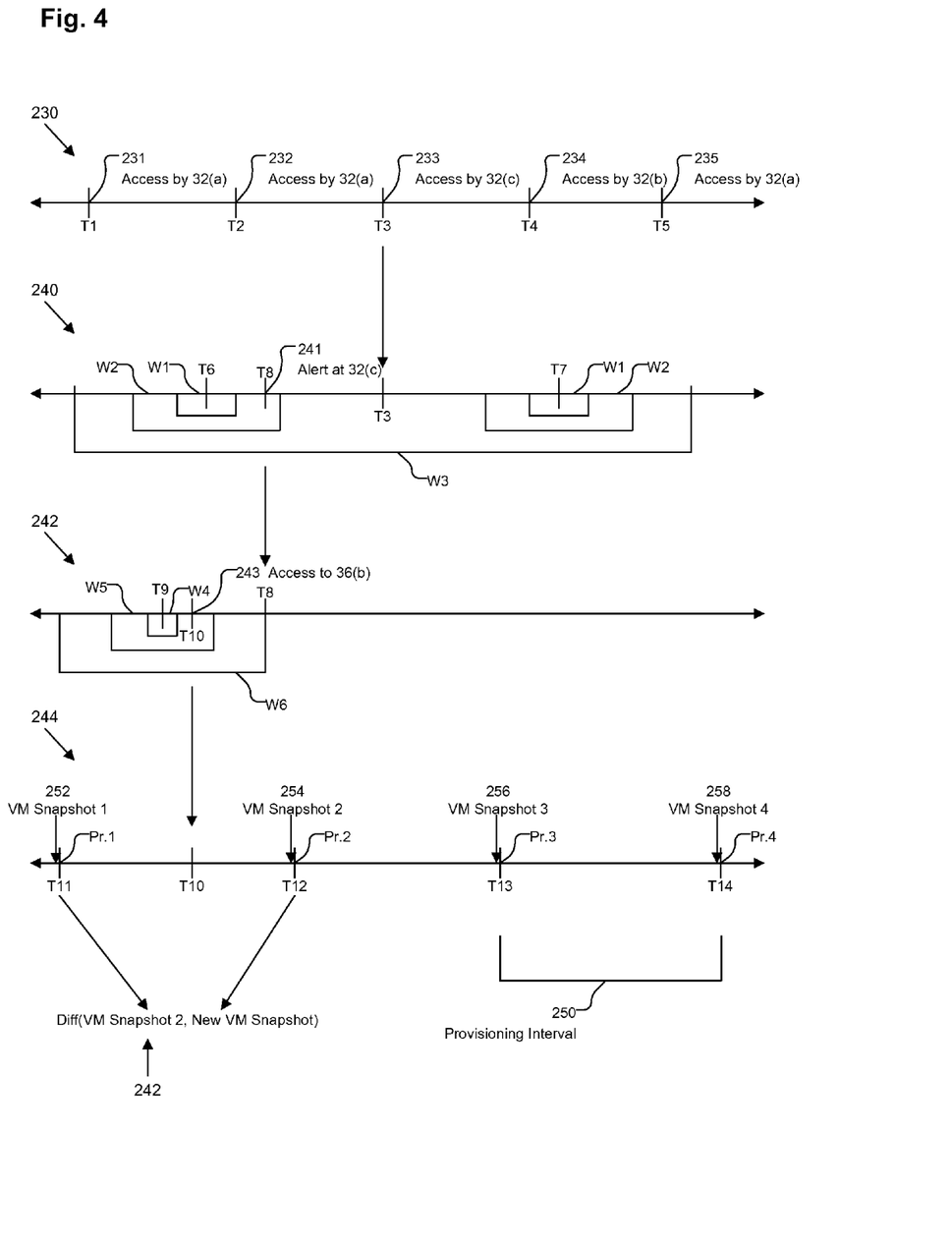
FIG. 4 illustrates example timelines associated with various embodiments.

For example, with reference to FIG. 4, example timeline 230 indicates that a particular leaked document version was accessed at five times, T1-T5. Access event 231 indicates that the document was accessed by endpoint 32(*a*) at time T1. Access event 232 indicates that the document was accessed by endpoint 32(*a*) at time T2. Access event 233 indicates that the document was accessed by endpoint 32(*c*) at time T3. Access event 234 indicates that the document was accessed by endpoint 32(*b*) at time T4. Access event 235 indicates that the document was accessed by endpoint 32(*a*) at time T5. In this example, access events 231-235 would be stored within set of access events 80.

There are various ways to determine which endpoints 32 have accessed the particular leaked version of the document. In one embodiment, the particular leaked version of the document may be identified by a filename and a timestamp. The CIRC server 46 may then search for instances of the filename having a timestamp at or after the identified timestamp in data storage devices available to the enterprise network 34 and search the access logs for the devices where the document was found. In other embodiments, the CIRC may search the FPC and/or SIEM logs for packets indicating a request or delivery of a file having the appropriate filename since the timestamp. In other embodiments, the CIRC server 46 may examine the contents of the particular leaked version of the document to create a hash of the document, and examine all file request and transfer records in the SIEM and/or FPC logs dating back to the time the document version was created.

In some embodiments, phase 1 is performed by the correlation engine 70, while in other embodiments, phase 1 is performed by the correlation engine 70 working in conjunction with the decision engine 72, while in other embodiments, phase 1 is performed by another software component of the CIRC server 46. In embodiments in which phase 1 is performed by the correlation engine 70 working in conjunction with the decision engine 72, decision engine 72 determines which criteria to use to search for the document, while correlation engine 70 utilizes the criteria set by the decision engine 72 to actually find the access events and create the set of access events 80 to be stored in memory 68.

In phase 2, step 140, CIRC server 46 correlates the set of access events 80 with logged security alerts (e.g., from STEM logs, from FPC logs, etc.) of certain types within a certain search interval, generating a set of suspicious events 82. In embodiments having a separate correlation engine 70 and decision engine 72, decision engine 72 generates the heuristics by setting the certain search interval as well as which type or types of security alerts to focus on, while correlation engine 70 applies the heuristics by utilizing the criteria set by the decision engine 72 to actually find the suspicious events and create the set of suspicious events 82 to be stored in memory 68. Decision engine 72 may set these criteria based on a best-guess of the Observe-Orient-Decide-Act (OODA) loop of the APT. In some embodiments, a member of the CIRT will make the best-guess about the OODA interval and input the certain search interval as well as which type or types of security alerts to focus on directly into the decision engine 72. In other embodiments, the decision engine 72 may look at all data received about the APT (e.g., the sites where the document was found, the document type of the leaked document, etc.) and correlate it with known data regarding previous APTs in order to make a best-guess about the OODA loop in order to determine the certain search interval as well as which type or types of security alerts to focus on. In other embodiments, the decision engine 72 may be pre-programmed to always set a specific initial certain search interval as well as a specific initial type or types of security alerts to focus on, for example, based on a typical OODA loop of a typical APT, such as, for example, a certain search interval of 24 hours within a 2 hour window.

It should be understood that in the context of STEM systems, there could be unique problems for detection and logging of security alerts depending on the complexity and the level of activities in the enterprise network, user population, and so on. Due to the real-time nature of SIEM alerting engines, generally these systems use an in-memory cache for maintaining state. Caching may present resource allocation problems when used for long-running alerts (as would be useful for monitoring and triggering on low-frequency alerts). These are alerts, which have been configured to look for events that occur within very large intervals of each other. As a result, this may require updates about the alert to be held in cache for a long time (while the alert waits on newer events which might result in successful triggering of the alert). For a purely memory-based cache, this would have increasing memory requirements while waiting on such partial alerts to complete and clear the cache of their intermediate states.

Hence, there are three techniques, which in various embodiments may be used within the SIEM application server 40 in order to effectively monitor for and trigger low-frequency alerts: Persistent Caching; Hierarchical Alerts; and Aggregation-based Alerting.

In the persistent caching approach, certain alerting rules, which typically create low-frequency alerts, are configured to utilize a persistent cache instead of a typical in-memory cache. Thus the SIEM application server 40, which is monitoring security events, can continue to function normally for most alert types. Thus, for rules which are geared towards high-frequency alerts (this is known, since the rules indicate the time-interval over which they are looking for events), the SIEM framework will choose to route the intermediate results caching to the in-memory cache 50 (see FIG. 1). However, for rules, which are geared towards low-frequency alerts, the SIEM framework will route to a persistent cache 52 (see FIG. 1), which is a cache that is designed to push to non-volatile disk after it has received sufficient information to efficiently complete within a single disk-write operation. When newer events come in, then they are checked to see which rules they are applicable with. If they will be triggering a low-frequency alert, then the persistent cache 52 is invoked to fetch the results from disk and the combine with the new event to decide whether the alert can be completed and raised. This may seem to have a performance hit, when trying to fetch from the disk, but a SIEM typically consumes around 1 million events and we expect only a small fraction of them to be ones which will result in low-frequency alerts. Hence, having a persistent caching mechanism eventually helps in having better results for low-frequency alerts.

In the hierarchical alerting approach, a single alerting rule is divided by a SIEM framework into multiple individual non-alerting rules, resulting in generation of various intermediate results. These intermediate results are looped back into the database, which stores the incoming events. Typically, an alerting rule waits for all the events which are required for input to occur, and, based on that, it fires an alert, but in the hierarchical alerting approach, certain sub-combinations of events combine to generate intermediate results (according to non-alerting rules), which can combine to eventually generate a low-frequency alert without using an excessive amount of cache. These non-alerting rules are generated in a hierarchical manner, such that the lowest level non-alerting rules are triggered based on the input events into the SIEM system. However, higher-level non-alerting rules are triggered based on a combination of both a) input events and b) past intermediate results from a lower-level set of non-alerting rules. So, the lowest-level non-alerting rules are fired first, resulting in some intermediate results, which further trigger (at some future point, when the corresponding events are noticed) higher-levels of non-alerting rules, eventually resulting in the firing of the highest-level/root-rule which is an alerting rule. The output of this rule, basically an alert, is then output from the STEM system for further analysis. Such a hierarchical firing of rules can be leveraged for triggering alerts, based on low-frequency events. It can thus assist in the detection of APTs. The hierarchical nature, as well as loopback logging of the intermediate results ensures that there are fewer continuous memory requirements while waiting for any low-frequency SIEM events. The lower-levels of the hierarchical rules can fire and store the intermediate output in the database. When newer events are received they are considered along with intermediate results, to generate further intermediate results eventually ending in a user alert.

In the aggregation-based alerting approach, multiple similar alerts can be aggregated into one combined alert in order to make it easier to notice an abundance of similar alerts, while saving storage space. Typically, within a SIEM system, each input SIEM event is considered separately while analyzing which rules will fire based on that event. As a result, when there are a huge number of similar SIEM events, then multiple instances of the same rule will fire, resulting in multiple instances of the same alert being raised. This results in a huge number of alerts, which then requires an ability outside of the SIEM system to collate them (or order them). One of the problems with such a higher number of alerts, is that the output stream is flooded with them and many low-priority alerts are lost out amongst them. Thus, instead, STEM application server 40 may fire alerts based on aggregated values of various input SIEM events. The rules are suitably altered so that, instead of identifying events as individual instances and firing individual alert instances, the SIEM application server 40 is modified to work on aggregates. The SIEM application server 40 holds the incoming events in a small buffer and generates an aggregate over similar events within that time-buffer. The individual events are discarded from the alert-generation queue and only the aggregated values are stored (against the corresponding event type identifier). Eventually, when all the various input required events cross the required threshold for an alert, then that alert is triggered. Since the inputs were aggregated, the alert is also not considered as a single instance but rather is associated with an aggregated value. Hence, when this alert is sent externally it goes as a single aggregated-value alert. It becomes easier for the SIEM users to identify that there are multiple such alerts, but they are all similar.

Returning to FIG. 4, example timeline 240 illustrates the operation of step 140 in connection with access event 233. Decision engine 72 might indicate, for example, that pings by machines external to the enterprise network 34 are suspicious, thereby setting the focus on that certain type of security alert. Decision engine 72 might also indicate, for example, that it suspects that the APT is characterized by an action delay of T3-T6 prior to a document access and an action delay of T7-T3 after the document access. Decision engine 72 might also indicate, for example, that it suspects that the APT is characterized by acting within a short window W1 around times T6 and T7. Alternatively, decision engine 72 might instead indicate that it suspects that the APT is characterized by acting within a longer window W2. Alternatively, decision engine 72 might instead indicate that it suspects that the APT is characterized by acting within or an even longer window W3 around the document access time T3, the longer window W3 encompassing both T6 and T7 within. Typically, within step 140, the window indicated by the decision engine 72 will include times both prior to and subsequent to the document access time.

Since access event 233 indicates an access of the document by endpoint 32(c), correlation engine 70 examines security events (e.g., from the SIEM logs) involving endpoint 32(c) according to the criteria set by the decision engine 72. In one scenario, correlation engine 70 might search within window W1 for external ping security alerts, in which case, it would find no suspicious events. However, if decision engine 72 had instead indicated windows W2 or W3, correlation engine 70 would have found a suspicious alert 241 at time T8 on endpoint 32(c).

In some embodiments, if correlation engine 70 finds a large number of security events within the set of suspicious events 82 on the same endpoint 32 all having the same type of security alert, correlation engine 70 may aggregate these similar security events together within a single aggregated suspicious event of the set of suspicious events 82 to allow more streamlines processing.

In actual operation, correlation engine 70 iterates through all events within the set of access events 80 and searches for the alert types indicated by the decision engine 72 within the window indicated by the decision engine 72.

Returning to FIG. 3, in phase 3, step 142, CIRC server 46 correlates the set of suspicious events 82 with accesses to enterprise-managed servers within a certain search interval, generating a set of suspicious accesses 84. In embodiments having a separate correlation engine 70 and decision engine 72, decision engine 72 generates the heuristics by setting the certain search interval, while correlation engine 70 applies the heuristics by utilizing the criteria set by the decision engine 72 to actually find the suspicious accesses and create the set of suspicious accesses 84 to be stored in memory 68. In some embodiments, the certain search interval used in step 142 is the same as the certain search interval used in step 140, while in other embodiments, the certain search interval used in step 142 may be different from the certain search interval used in step 140. Decision engine 72 may set the certain search interval based on a best-guess of the OODA loop of the APT. In some embodiments, a member of the CIRT will make the best-guess about the OODA interval and input the certain search interval. In other embodiments, the decision engine 72 may look at all data received about the APT (e.g., the sites where the document was found, the document type of the leaked document, etc.) and correlate it with known data regarding previous APTs in order to make a best-guess about the OODA loop in order to determine the certain search interval. In other embodiments, the decision engine 72 may be pre-programmed to always set a specific initial certain search interval, for example, based on a typical CODA loop of a typical APT, such as, for example, a certain search interval of 48 hours within a 6 hour window.

Looking at FIG. 4, example timeline 242 illustrates the operation of step 142 in connection with suspicious alert 241 at time T8 on endpoint 32(c). Decision engine 72 might indicate, for example, that it suspects that the APT is characterized by an action delay of T8-T9 prior to a suspicious alert. Decision engine 72 might also indicate, for example, that it suspects that the APT is characterized by acting within a short window W4 around time T9. Alternatively, decision engine 72 might instead indicate that it suspects that the APT is characterized by acting within a longer window W5 or W6. Typically, within step 142, the window indicated by the decision engine 72 will include times prior to the suspicious alert, although in some embodiments, the window indicated by the decision engine 72 will include times both prior to and subsequent to the suspicious alert.

Since suspicious alert 241 indicates a particularly suspicious type of security alert in proximity (within the certain search interval of step 140) to an access of the document by endpoint 32(c), correlation engine 70 examines security events (e.g., from the SIEM logs) involving endpoint 32(c) and an enterprise-managed server 36 that are in proximity to suspicious alert 241 according to the certain search interval of step 142 set by the decision engine 72. In one scenario, correlation engine 70 might search within window W4 for alerts indicating an access to an enterprise-managed server 36, in which case, it would find no suspicious accesses. However, if decision engine 72 had instead indicated windows W4 or W5, correlation engine 70 would have found a suspicious access 243 of enterprise-managed server 36(b) at time T10 by endpoint 32(c).

In some embodiments, if correlation engine 70 finds a large number of suspicious accesses within the set of suspicious accesses 84 all made by the same endpoint 32 to the same enterprise-managed server 36, correlation engine 70 may aggregate these similar suspicious accesses together within a single aggregated suspicious access of the set of suspicious accesses 84 to allow more streamlines processing.

In actual operation, correlation engine 70 iterates through all events within the set of suspicious events 82 and searches for accesses to all enterprise-managed servers 36 within the window indicated by the decision engine 72.

Returning to FIG. 3, in phase 4, step 144, CIRC server 46 correlates the set of suspicious accesses 84 (which each involve both an endpoint 32 and an enterprise-managed server 36) with suspicious changes to the enterprise-managed server 36, generating a reduced set of events 86. In embodiments having a separate correlation engine 70 and decision engine 72, decision engine 72 generates the heuristics by setting which type or types of suspicious changes to the enterprise-managed server 36 to focus on, while correlation engine 70 applies the heuristics by utilizing the criteria set by the decision engine 72 to actually find the suspicious accesses that were in proximity to suspicious changes to the enterprise-managed server 36 and create the reduced set of events 86 to be stored in memory 68.

Decision engine 72 may set these criteria based on a best-guess of characteristics of the APT. In some embodiments, a member of the CIRT will make the best-guess about the characteristics of the APT and input the type or types of suspicious changes to focus on directly into the decision engine 72. In other embodiments, the decision engine 72 may look at all data received about the APT (e.g., the sites where the document was found, the document type of the leaked document, etc.) and correlate it with known data regarding previous APTs in order to make a best-guess about the type or types of suspicious changes to focus on. In other embodiments, the decision engine 72 may be pre-programmed to always use a specific type or types of suspicious changes to focus on, for example, based on a typical APT, such as, for example, all changes to the enterprise-managed server 36(b) that involved the same endpoint 32(c) that accessed that enterprise-managed server 36(b).

Correlation engine 70 may correlate the set of suspicious accesses 84 with suspicious changes to the enterprise-managed server 36 by first analyzing a set of VM snapshots 252, 254, 256, 258 provided by VM snapshot and reprovisioning server 44. As mentioned previously, in certain embodiments, each enterprise-managed server 36 is a virtual server running as a VM on one or more computerized devices. Recall that in these embodiments, these virtual servers may be periodically provisioned or reprovisioned by VM snapshot and reprovisioning server 44, which may also take VM snapshots of the VM states prior to each reprovisioning. Thus, correlation engine 70 is able to determine what changes have been made to the enterprise-managed server 36 in close proximity to a suspicious access by examining differences between a VM snapshot made just after the suspicious access and the VM snapshot provided by the VM snapshot and reprovisioning server 44. Once the differences have been ascertained, correlation engine 70 may proceed to analyze the differences for patterns associated with the type or types of suspicious changes to focus on provided by the decision engine 72.

Looking at FIG. 4, example timeline 244 illustrates the operation of step 144 in connection with suspicious access 243 of enterprise-managed server 36(b) by endpoint 32(c) at time T10. Decision engine 72 might indicate, for example, that pings by machines external to the enterprise network 34 are suspicious, thereby setting the certain type of security alerts to focus on. Decision engine 72 might also indicate, for example, that changes made to the enterprise-managed server 36(b) by the same endpoint 32(c) that was found to have accessed the enterprise-managed server 36(b) in phase 3 are to be considered suspicious.

Timeline 244 also indicates that VM snapshot and reprovisioning server 44 has reprovisioned enterprise-managed server 36(b) at time T11 (in provisioning event Pr.1), at time T12 (in provisioning event Pr.2), at time T13 (in provisioning event Pr.3), and at time T14 (in provisioning event Pr.4). These reprovisioning events Pr.1-Pr.4 are separated by a provisioning interval 250. In one embodiment, provisioning interval 250 may be, for example, one hour. Immediately prior to each reprovisioning event Pr.1-Pr.4, VM snapshot and reprovisioning server 44 takes a current snapshot of the enterprise-managed server 36(b), thereby generating VM snapshots 252, 254, 256, 258.

Since suspicious access 243 indicates an access of the enterprise-managed server 36(b) by endpoint 32(c) at time T10, correlation engine 70 examines the next VM snapshot of enterprise-managed server 36(b) taken after time T10, e.g., VM snapshot 2 254 taken just before time T12, and compares it to the VM snapshot provided by the VM snapshot and reprovisioning server 44, to generate the differences 242.

Correlation engine 70 then examines the differences 242 and looks for changes of a type that have been indicated as suspicious by decision engine 72, e.g., changes that have been initiated by endpoint 32(c). If any suspicious changes are found within the differences 242, then suspicious access 243 is stored within the reduced set of events 86 together with an indication of any suspicious changes found in close proximity thereto as well as all corresponding suspicious events drawn from the set of suspicious events 82 associated therewith.

In actual operation, correlation engine 70 iterates through all suspicious accesses within the set of suspicious accesses 84 and searches for the suspicious changes indicated by the decision engine 72 within proximity to each suspicious access.

Returning back to FIG. 3, in step 150, CIRC server 46 compares the size of the reduced set of events 86 to a minimum threshold size 90. If the size exceeds the minimum threshold 90 (known as an affirmative result), then operation proceeds to step 160. Otherwise (known as a negative result), operation proceeds to steps 152, 154, or 156, as explained in further detail below. Minimum threshold size 90 represents the minimum number of events for the CIRT to consider. In one embodiment, for example, minimum threshold size 90 is set to 10. Any fewer security alerts within the reduced set of events 86 would lead to a high risk that a security alert relating to the actual APT would not be within the reduced set of events, thus generating a negative result when the size of the reduced set of events 86 is less than 10. In one embodiment, step 150 is performed by correlation engine 70.

In one embodiment, the first time step 150 renders a negative result (i.e., the size of the reduced set of events 86 is less than the minimum threshold 90), operation proceeds to step 152. In step 152, decision engine 72 increases the size of the set of types of suspicious changes to focus on in phase 4, and then operation proceeds with phase 4 (step 144) again. For example, when phase 4 was originally performed, decision engine 72 may have set the set of types of suspicious changes to include only changes made by the endpoint 32 that originally accessed the enterprise-managed server 36, but, in step 152, decision engine 72 may also add additional changes to the set of types of suspicious changes to focus on in phase 4. For example, decision engine 72 may add that registry changes should also be regarded as suspicious. If, upon performing step 150 a second time, the size of the reduced set of events 86 still does not exceed the minimum threshold 90, in some arrangements, step 152 may be performed again, this time further increasing the size of the set of types of suspicious changes to focus on in phase 4, for example, by adding that changes to system files should also be regarded as suspicious, and then proceeding with phase 4 (step 144) again. This looping may continue until either step 150 returns an affirmative result (i.e., the size of the reduced set of events 86 exceeds the minimum threshold 90) or until decision engine 72 returns a pre-set maximum number of types of suspicious changes.

In one embodiment, if, after executing step 152 and steps 144-150 until step 152 returns a maximum number of types of suspicious changes, step 150 still returns a negative result (i.e., the size of the reduced set of events 86 is still less than the minimum threshold 90), operation proceeds to step 154.

In step 154, decision engine 72 increases the size of the search interval to use in phase 3, and then operation proceeds with phase 3 (step 142) again. For example, when phase 3 was originally performed, decision engine 72 may have set the search interval to be T8-T9 prior to the suspicious access within a small window W4, but, in step 154, decision engine 72 may change the search interval to be T8-T9 prior to the suspicious access within a medium window W5 (see example in FIG. 4). If, upon performing step 150 again, the size of the reduced set of events 86 still does not exceed the minimum threshold, in some arrangements, step 154 may be performed again, this time further increasing the size of the search interval to use in phase 3, and then proceeding with phase 3 (step 142) again. For example, the size of the search interval may be increased to the large window W6. This looping may continue until either step 150 returns an affirmative result (i.e., the size of the reduced set of events 86 exceeds the minimum threshold 90) or until decision engine 72 returns a pre-set maximum search interval (e.g., window W6 is the largest search interval in the example of FIG. 4).

In one embodiment, if, after executing step 154 and steps 142-150 until step 154 returns a pre-set maximum search interval, step 150 still returns a negative value (i.e., the size of the reduced set of events 86 is still less than the minimum threshold 90), operation proceeds to step 156.

In step 156, decision engine 72 increases the size of the search interval to use in phase 2 and increases the number of which types of security alerts to focus on in phase 2, and then operation proceeds with phase 2 (step 140) again. In some embodiments, either the size of the search interval to use in phase 2 or the number of which types of security alerts to focus on in phase 2 is increased, but not both, while, in other embodiments, both the size of the search interval to use in phase 2 and the number of which types of security alerts to focus on in phase 2 are increased. For example, when phase 2 was originally performed, decision engine 72 may have set the search interval to be T3-T6 prior to the suspicious access within a small window W1, but, in step 154, decision engine 72 may change the search interval to be both T3-T6 prior to the suspicious event and T7-T3 after the suspicious event within a medium window W2 (see example in FIG. 4). In some embodiments, decision engine 72 may also increase the number of which types of security alerts to focus on in phase 2 from just external pings to also include external accesses from unknown addresses. If, upon performing step 150 again, the size of the reduced set of events 86 still does not exceed the minimum threshold 90, in some arrangements, step 156 may be performed again, this time further increasing the size of the search interval to use in phase 2 and/or further increasing the number of which types of security alerts to focus on in phase 2, and then proceeding with phase 2 (step 140) again. For example, the size of the search interval may be increased to the large window W3 and/or the number of which types of security alerts to focus on in phase 2 may be increased to further include encrypted requests from external addresses. This looping may continue until either step 150 returns an affirmative result (i.e., the size of the reduced set of events 86 exceeds the minimum threshold 90) or until decision engine 72 returns a pre-set maximum search interval (e.g., window W3 is the largest search interval in the example of FIG. 4) and a pre-set maximum number of types of security alerts to focus on in phase 2.

In step 160, the size of the reduced set of events is compared to a maximum threshold size 92. If the size exceeds the maximum threshold 92, then operation proceeds to step 170 as explained in further detail below. Otherwise, operation proceeds to step 165 as explained in further detail below. Maximum threshold size 92 represents the maximum number of events that the CIRT can reasonably be expected to consider without spending excessive time on one threat. In one embodiment, for example, maximum threshold size 92 is set to 50. It should be understood that the maximum threshold size 92 may depend on the importance of the leaked document, and it may, in some embodiments, be input by the CIRT over the UI 64 on a case-by-case basis. In one embodiment, step 160 is performed by correlation engine 70.

In step 165, decision engine 72 reduces the size of the various search intervals used in phases 2 and 3 and/or reduces the number of types of alerts or suspicious changes used in phases 2 and 4. In some embodiments, step 165 takes a top-down approach, first tightening criteria to be used in phase 2, then phase 3, and then phase 4. In other embodiments, step 165 takes a bottom-up approach, first tightening criteria to be used in phase 4, then phase 3, and then phase 2. In either case, step 165 may be repeated with tighter and tighter criteria until step 160 returns an affirmative result, indicating that the size of the reduced set of events 86 does not exceed the maximum threshold size 92.

In step 170, once the size of the reduced set of events 86 is between the minimum and maximum thresholds 90, 92, CIRC server 46 outputs the reduced set of events 86 to the CIRT over the user interface 64 (or, in some embodiments, across network interface 62). The CIRT is then able to examine the events recorded in the reduced set of events to attempt to ascertain the source of the APT infection to prevent further leaks and to close security holes to prevent future infections by similar APTs.

At this point it should be understood that correlation engine 70 and decision engine 72 are, in some embodiments, separate components not only because separating these components allows them to run in parallel, but also because the correlation engine 70 often needs to process very large sets of data, which is best done through a massively parallel distributed computing system, but the decision engine 72 needs to maintain state in order to backtrack through the phases. It is well-known that the maximum benefits of any parallel computing are possible when there is minimal state storage or decision-making required. Hence, the smaller decision engine 72 is able to maintain state to properly calculate the backtracking, while the larger correlation engine 70 is able to efficiently spread out its calculations in a distributed fashion without the need to maintain the state information stored by the decision engine 72. Furthermore, the decision engine 72 is also better able to interact with human CIRT members by being kept separate from the massive correlation engine 70.

While various embodiments of the invention have been particularly shown and described, it will be understood by those skilled in the art that various changes in form and details may be made therein without departing from the spirit and scope of the invention as defined by the appended claims.

For example, it should be understood that although steps 150-156 have been described and illustrated as being part of step 120, and steps 160-165 have been described and illustrated as being external to step 120, this is by way of example only. In some embodiments, the functionality of steps 150-156 may be understood to be external to step 120, and the functionality of steps 160-165 may be understood to be to part of step 120. In other embodiments, the functionality of all of steps 150-165 may be understood to be part of step 120, while in yet other embodiments, the functionality of all of steps 150-165 may be understood to be external to step 120.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of detecting an advanced persistent threat (APT) attack on an enterprise system, the method comprising:
receiving, in a computerized device, an indication that a document has been leaked outside the enterprise system;
evaluating a log of security events of the enterprise system using a set of heuristics to produce a reduced set of events potentially relevant to the APT attack; and
outputting the reduced set of events over a user interface for consideration by a security analysis team;
wherein evaluating the log of security events includes:
in a decision engine module, determining a set of heuristic criteria based on external data about the APT attack;
in a correlation engine module, applying the set of heuristic criteria to identify security events from the log of security events that are consistent with the external data about the APT attack;
determining whether a number of the identified security events exceeds a minimum threshold value;
if the number of the identified security events does not exceed the minimum threshold value, then modifying, at the decision engine module, the set of heuristic criteria until the number of the identified security events produced by the correlation engine exceeds the minimum threshold value; and
if the number of the identified security events exceeds the minimum threshold value, then using the identified security events as the reduced set of events;
wherein:
evaluating the log of security events further includes identifying a set of access events within the log of security events in which an endpoint machine has accessed the document;
determining the set of heuristic criteria includes:
determining a document-access time window consistent with the external data about the APT attack; and
determining a set of security event types consistent with the external data about the APT attack; and
applying the set of heuristics includes:
for each access events of the set of access events, searching for security events from the log of security events that are associated with a corresponding endpoint machine and within the document-access time window in proximity to that access event; and
searching the security events identified to be within the document-access time window for security events of a type that falls within the set of security event types to produce a set of suspicious events.

2. The method of claim 1 wherein:
determining the set of heuristic criteria further includes determining a server-access time window consistent with the external data about the APT attack; and
applying the set of heuristics further includes:
searching for security events from the log of security events that are within the server-access time window prior to each suspicious event of the set of suspicious events and associated with a same endpoint machine; and
searching the security events identified to be within the server-access time window for security events that indicate access to an enterprise-managed server of a set of enterprise-managed servers to produce a set of suspicious accesses.

3. The method of claim 2 wherein:
each enterprise-managed server of the set of enterprise-managed servers is a virtual server running on a computerized device, the computerized device being re-provisioned with a virtual machine (VM) snapshot of that enterprise-managed server at periodic provisioning intervals, a recorded VM snapshot being taken of that enterprise-managed server just prior to each re-provisioning;
determining the set of heuristic criteria further includes determining a set of suspicious change types associated with the set of enterprise-managed servers consistent with the external data about the APT attack; and
applying the set of heuristics includes:
for each suspicious access of the set of suspicious accesses, determining a set of changes within the corresponding enterprise-managed server between a next recorded VM snapshot taken after that suspicious access and the VM snapshot of that enterprise-managed server; and
searching for changes within the set of changes for each suspicious access of a type that falls within the set of suspicious change types to produce the identified security events.

4. The method of claim 3 wherein the set of enterprise-managed servers include virtual servers drawn from the set of:
web servers;
file transfer servers; and
mail servers.

5. The method of claim 1 wherein searching the security events identified to be within the document-access time window for security events of the type that falls within the set of security event types to produce the set of suspicious events includes aggregating together security events of the same type as each other.

6. The method of claim 1 wherein:
the document is a particular version of a document stored within the enterprise system; and
identifying the set of access events within the log of security events in which an endpoint machine has accessed the document includes:
calculating a hash signature of the particular version of the document; and
searching a full-packet capture log of the enterprise system for file-transfer events prior to a time that the APT attack was discovered that have a same hash signature as the calculated hash signature of the particular version of the document.

7. The method of claim 1 wherein:
the document is a particular version of a document stored within the enterprise system; and
identifying the set of access events within the log of security events in which an endpoint machine has accessed the document includes:
identifying a filename and timestamp of the particular version of the document; and
searching the log of security events for file-transfer request events that include the filename between a time identified by the timestamp and a time that the APT attack was discovered.

8. The method of claim 1 wherein:
the document is a particular version of a document stored within the enterprise system; and
identifying the set of access events within the log of security events in which an endpoint machine has accessed the document includes:
identifying a filename and timestamp of the particular version of the document;
searching for locations in enterprise data storage having the identified filename and a timestamp at or after the identified timestamp; and
searching access logs for devices associated with locations having the identified filename for file-transfer events that include the filename between a time identified by the timestamp and a time that the APT attack was discovered.

9. An enterprise system comprising:
a set of endpoint machines;
a set of enterprise-managed servers;
a security logging system;
a Critical Incident Response Center (CIRC) server; and
a network, connecting the set of endpoint machines, the set of enterprise-managed servers, the security logging system, and the CIRC server;
wherein, the CIRC server is configured to detect an advanced persistent threat (APT) attack on the enterprise system by:
receiving an indication that a document has been leaked outside the enterprise system;
evaluating a log of security events from the security logging system using a set of heuristics to produce a reduced set of events potentially relevant to the APT attack; and
outputting the reduced set of events for consideration by a security analysis team
wherein the CIRC server, when evaluating the log of security events, is configured to:
in a decision engine module, determine a set of heuristic criteria based on external data about the APT attack;
in a correlation engine module, apply the set of heuristic criteria to identify security events from the log of security events that are consistent with the external data about the APT attack;
determine whether a number of the identified security events exceeds a minimum threshold value;
if the number of the identified security events does not exceed the minimum threshold value, then modify, at the decision engine module, the set of heuristic criteria until the number of the identified security events produced by the correlation engine exceeds the minimum threshold value;
if the number of the identified security events exceeds the minimum threshold value, then use the identified security events as the reduced set of events; and
identify a set of access events within the log of security events in which an endpoint machine has accessed the document;
wherein:
determining the set of heuristic criteria includes:
determining a document-access time window consistent with the external data about the APT attack; and
determining a set of security event types consistent with the external data about the APT attack; and
applying the set of heuristics includes:
for each access event of the set of access events, searching for security events from the log of security events that are associated with a corresponding endpoint machine and within the document-access time window in proximity to that access event; and
searching the security events identified to be within the document-access time window for security events of a type that falls within the set of security event types to produce a set of suspicious events.

10. The enterprise system of claim 9 wherein:
determining the set of heuristic criteria further includes determining a server-access time window consistent with the external data about the APT attack;
applying the set of heuristics further includes:
searching for security events from the log of security events that are within the server-access time window prior to each suspicious event of the set of suspicious events and associated with a same endpoint machine; and
searching the security events identified to be within the server-access time window for security events that indicate access to an enterprise-managed server of a set of enterprise-managed servers to produce a set of suspicious accesses;
each enterprise-managed server of the set of enterprise-managed servers is a virtual server running on a computerized device, the computerized device being re-provisioned with a virtual machine (VM) snapshot of that enterprise-managed server at periodic provisioning intervals, a recorded VM snapshot being taken of that enterprise-managed server just prior to each re-provisioning;
determining the set of heuristic criteria further includes determining a set of suspicious change types associated with the set of enterprise-managed servers consistent with the external data about the APT attack; and
applying the set of heuristics includes:
for each suspicious access of the set of suspicious accesses, determining a set of changes within the corresponding enterprise-managed server between a next recorded VM snapshot taken after that suspicious access and the VM snapshot of that enterprise-managed server; and
searching for changes within the set of changes for each suspicious access of a type that falls within the set of suspicious change types to produce the identified security events.

11. The enterprise system of claim 10 wherein the set of enterprise-managed servers include virtual servers drawn from the set of:
web servers;
file transfer servers; and
mail servers.

12. The enterprise system of claim 9 wherein the security logging system includes one of:
- a full-packet capture log of the enterprise system; and
- a security information and event management log of the enterprise system.

13. A computer program product comprising a non-transitory computer-readable storage medium storing a set of instructions, which, when executed by a computer, cause the computer to:
- receive an indication that a document has been leaked outside an enterprise system;
- evaluate a log of security events of the enterprise system using a set of heuristics to produce a reduced set of events potentially relevant to an advanced persistent threat (APT) attack; and
- output the reduced set of events over a user interface for consideration by a security analysis team;
- wherein the set of instructions, when executed by the computer, cause the computer to, when evaluating the log of security events:
  - in a decision engine module, determine a set of heuristic criteria based on external data about the APT attack;
  - in a correlation engine module, apply the set of heuristic criteria to identify security events from the log of security events that are consistent with the external data about the APT attack;
  - determine whether a number of the identified security events exceeds a minimum threshold value;
  - if the number of the identified security events does not exceed the minimum threshold value, then modify, at the decision engine module, the set of heuristic criteria until the number of the identified security events produced by the correlation engine exceeds the minimum threshold value; and
  - if the number of the identified security events exceeds the minimum threshold value, then use the identified security events as the reduced set of events;
- wherein the set of instructions, when executed by the computer, cause the computer to:
  - when evaluating the log of security events, identify a set of access events within the log of security events in which an endpoint machine has accessed the document; and
  - when determining the set of heuristic criteria:
    - determine a document-access time window consistent with the external data about the APT attack; and
    - determine a set of security event types consistent with the external data about the APT attack;
  - when applying the set of heuristics:
    - for each access event of the set of access events, search for security events from the log of security events that are associated with a corresponding endpoint machine and within the document-access time window in proximity to that access event; and
    - search the security events identified to be within the document-access time window for security events of a type that falls within the set of security event types to produce a set of suspicious events.

14. The computer program product of claim 13 wherein the set of instructions, when executed by the computer, cause the computer to:
- when determining the set of heuristic criteria, determine a server-access time window consistent with the external data about the APT attack; and
- when applying the set of heuristics:
  - search for security events from the log of security events that are within the server-access time window prior to each suspicious event of the set of suspicious events and associated with a same endpoint machine; and
  - search the security events identified to be within the server-access time window for security events that indicate access to an enterprise-managed server of a set of enterprise-managed servers to produce a set of suspicious accesses.

* * * * *